UNITED STATES PATENT OFFICE.

MARY J. R. GREENMAN, OF WILKESBARRE, PENNSYLVANIA.

PROCESS OF HARDENING METALS.

SPECIFICATION forming part of Letters Patent No. 710,452, dated October 7, 1902.

Application filed May 15, 1902. Serial No. 107,501. (No specimens.)

*To all whom it may concern:*

Be it known that I, MARY J. R. GREENMAN, a citizen of the United States, residing at Wilkesbarre, in the county of Luzerne and State of Pennsylvania, have invented certain new and useful Improvements in Processes of Hardening Metals; and I do hereby declare the following to be a full, clear, and exact description of the invention, such as will enable others skilled in the art to which it appertains to make and use the same.

My invention relates to a process for hardening metals, either precious metals, copper, or iron.

The ingredients employed for carrying out the process are charcoal, bone-dust, sulfur, sal-ammoniac, sugar, salt, magnesia, borax, potash, arsenic, sweet spirits of niter, and sulfuric acid.

The method of employing the process is as follows: Prior to adding the niter and sulfuric acid all of the solid ingredients above set forth are pulverized and thoroughly mixed or commingled. These ingredients are then placed in a retort, and the copper or other metal to be hardened is embedded in these ingredients within the retort, so as to be entirely covered by the same. Spirits of niter diluted with about equal parts of water is poured upon the mass, so as to moisten the same, and then sulfuric acid diluted with about equal parts of water is poured on. The vessel or retort is then closed and heat slowly applied, the same being increased gradually.

At the end of about five or six hours the mixture will be found to have been fused into a gray slag and the carbon of the ingredients to have become absorbed in the metal, and the hardness of the metal will be found to have greatly increased.

This process is particularly applicable to pure metals without alloy.

For the purpose of tempering cutlery-steel I employ the hereinabove-mentioned ingredients with the exception of the charcoal and bone-dust. To the ingredients used I add about five gallons of distilled water, which dissolves all of such ingredients with the exception of the sulfur and magnesia, which, being insoluble in water, settle to the bottom of the receptacle in the form of a sediment. The steel is heated to a cherry red and plunged into this bath, and when drawn out it will be found to be hardened. Then the temper is drawn to the depth of the edge required and the metal ground and polished.

The ingredients above set forth are mixed in about the following proportions: Four quarts charcoal, one quart bone-dust, three ounces sulfur, three ounces sal-ammoniac, three ounces sugar, three ounces salt, three ounces magnesia, three ounces borax, three ounces potash, three ounces arsenic, six fluid ounces sweet spirits of niter, six fluid ounces sulfuric acid.

Having now described my process and disclosed the ingredients employed in carrying out the same and the proportions in which the same are used, what I claim as new, and desire to secure by Letters Patent, is—

1. The process of hardening metals which consists in subjecting the same to the action of sulfur, sal-ammoniac, sugar, salt, magnesia, borax, potash, arsenic, spirits of niter and sulfuric acid, substantially as described.

2. The process of hardening metals which consists in dissolving in distilled water, sulfur, sal-ammoniac, sugar, salt, magnesia, borax, potash, arsenic, spirits of niter, and sulfuric acid, heating the metal to a cherry-red heat and plunging the same into the bath and then withdrawing the same and allowing it to cool, substantially as described.

In testimony whereof I hereunto affix my signature in presence of two witnesses.

MARY J. R. GREENMAN.

Witnesses:
ANNA M. WILLIAMS,
JOSEPH L. DAVIES.